Sept. 1, 1970   R. E. BEESON   3,526,558
PROCESS FOR MAKING A DECORATIVE THERMOSETTING PLASTIC PANEL
Filed June 27, 1966

INVENTOR.
ROBERT E. BEESON
BY
Christie, Parker & Hale
ATTORNEYS

United States Patent Office 3,526,558
Patented Sept. 1, 1970

3,526,558
PROCESS FOR MAKING A DECORATIVE THERMOSETTING PLASTIC PANEL
Robert E. Beeson, Los Angeles, Calif., assignor to Mill Polishing Corporation, Huntington Park, Calif., a corporation of California
Filed June 27, 1966, Ser. No. 560,716
Int. Cl. B32b 7/06, 33/00
U.S. Cl. 156—219   4 Claims

ABSTRACT OF THE DISCLOSURE

A process for making a decorative thermosetting-plastic panel having adjacent smooth and slightly roughened areas. The panel surface is formed under heat and pressure against a press plate having adjacent smooth and roughened areas, the latter zones having a surface roughness of less than about 150 microinches R.M.S. average to avoid adherence of the panel to the plate. Different reflectance values in the smooth and roughened areas of the panel create a decorative multiple-tone effect.

BACKGROUND OF THE INVENTION

Figure 1:
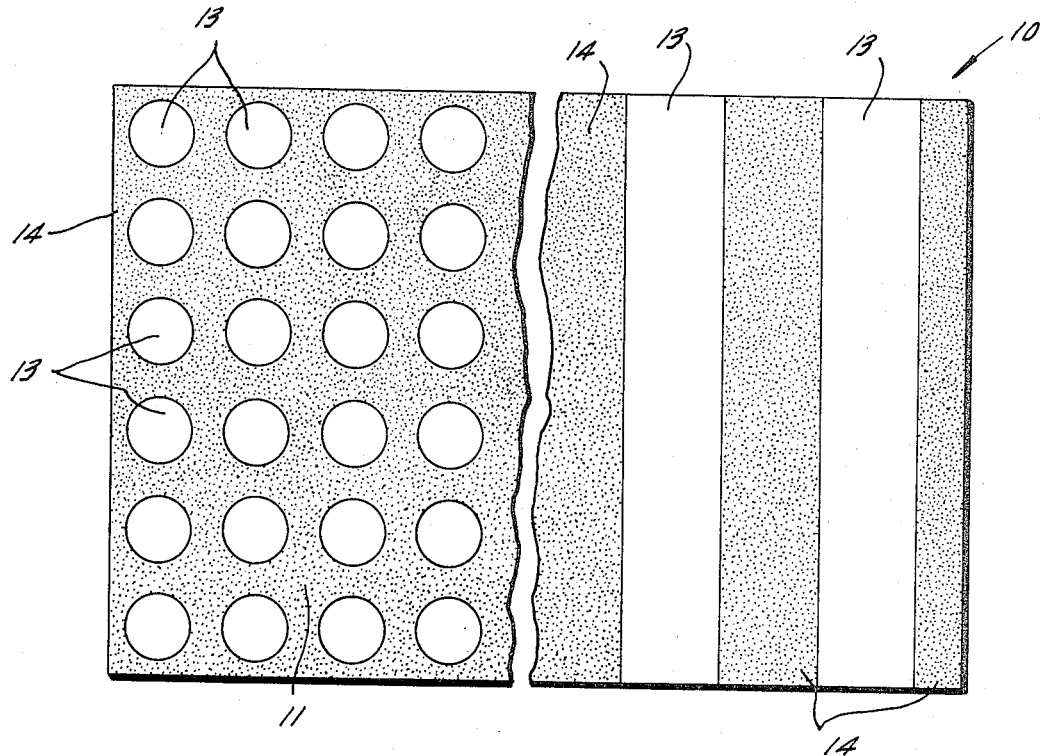

Plastic panels, and especially laminated plastic panels, have come into widespread use in the interior finishing of buildings and other structures, and in the manufacture of furniture. For example, such panels may be used as walls, doors, and room dividers in homes, schools, office buildings, automobiles and airplanes, etc. They are also useful to form attractive table tops and other articles of manufacture. Such panels can be formed in a variety of attractive colors, have excellent durability, are relatively fire resistant, and are easy to clean and maintain.

For many years, the visible face of such panels was finished as a smooth, glossy surface. A more recent development has been the use of embossed, dull-finish surfaces to provide a subtle, low-reflectance panel for use in furniture and in other applications where a glossy surface is undesirable.

There has remained, however, a demand for plastic panels which have a patterned surface to avoid the expanse of unbroken, uniform surface presented by either glossy or dull-finish panels. In the past, patterned-surface panels have been manufactured by laminating colored, patterned sheets of kraft paper between a transparent or translucent plastic sheet and a resin-impregnated base material. Although this procedure provides an attractive finished product, it is a slow and expensive manufacturing technique as the "layup" or assembly of the several laminae must be done by hand to insure proper alignment of the pattern-imparting sheets. This alignment is important to insure that the patterns in several panels mounted side-by-side will line up properly at the junction of the panels. The resulting product is expensive and poorly adapted to mass-production manufacture.

The panel of this invention is a fresh approach to satisfying the demand for patterned plastic panels. Instead of attempting to impart a pattern in the panel surface by using a patterned intermediate sheet in a laminate, I have found that a very attractive, patterned panel can be produced by finishing the surface of the panel in a pattern of alternating smooth and slightly roughened areas. The reflectance of the slightly roughened area is much lower than the smooth-finished areas, producing a multiple-tone effect in a uniformly colored pattern.

The intensity and clarity of the multi-tone effect varies according to the relative position of the observer and the source of panel illumination, further enhancing the appearance of the panel as contrasted with a conventional uniformly finished panel. The smooth and slightly roughened areas can be arranged in a variety of decorative patterns to give the user a broad selection of materials.

The combination of glossy and matte surfaces in a thermoplastic sheet has been proposed in U.S. Pat. 2,697,893, but this disclosure has not solved the problem of economical, efficient production of such surfaces in thermosetting-plastic materials. Thermosetting plastics are greatly preferred over thermoplastic materials for both structural panels and furniture construction because thermosetting panels are strong, have excellent resistance to burns and mars, and are easy to clean and maintain. Thermoplastic materials have found little use in these applications due to their relatively low structural strength and their susceptibility to surface scratches and heat damage. However, thermosetting materials have presented certain problems with respect to surface finishing in a laminating press.

Laminated panels of both thermosetting and thermoplastic materials are typically cured and surface finished in a laminating press which applies both heat and pressure to the panel for a curing period of perhaps one hour. A smooth surface may be formed on the panel by forcing a planishing surface of a press plate (sometimes called a caul plate) against a face of the panel as it is cured in the laminating press. The finish on the planishing surface of the press plate is transferred to the surface of the plastic panel during the curing period in the laminating press.

The planishing surface may include a design of rough and smooth areas, and this design will be transferred to the surface of the plastic panel. However, this technique has heretofore been successful only with panels formed of thermoplastic materials, because thermosetting materials present the serious problem of sticking to a roughened press plate after completion of the laminate-curing cycle.

A significant feature of the invention is the determination of the specific nature of the roughened surface which is necessary to avoid sticking of the press plate to the thermosetting-plastic sheet. Unlike thermoplastic materials which can be dislodged from an adhering press plate simply by reapplication of heat, thermosetting materials may lock themselves into depressions in a press plate. To strip apart the thermosetting sheet and press plate, it may be necessary to destroy the surface finish on the sheet. After the stripping operation is complete, particles of thermosetting plastic which have separated from the sheet may remain in the roughened planishing surface of the press plate. It is then necessary to etch these particles out of the roughened areas on the planishing surface, increasing manufacturing expense and possibly even destroying the patterned or textured surface of the costly press plate.

I have found that these difficulties may be avoided by limiting the surface roughness of the roughened areas of the press plate to no more than 150 microinches RMS average. This measure of roughness is conventional, and is defined as the square root of the average square of a series of measurements of surface deviation from a mean line, the deviations being expressed in microinches. The mean line is parallel to the surface of the roughened area, and is positioned approximately midway in the depth of the surface particles which form the roughened area. Limiting the surface roughness to a value less than 150 microinches RMS average solves the problem of thermosetting-sheet adherence to the planishing surface of the press plate, permitting a clean separation of the cured panel or sheet from the press plate.

Using the concept of the invention, the pattern formed in the planishing surface of the press plate is transferred to a sheet of thermosetting plastic such as melamine. The plastic sheet may be opaque and colored, or may be transparent or translucent and laminated to a sheet of uniformly colored material which is in turn bonded to a thermosetting-resin-impregnated base material.

Briefly stated, the decorative panel of this invention comprises a sheet of thermosetting plastic having a front or finished face which has adjacent smooth and slightly roughened areas. The surface roughness in the roughened area is less than 150 microinches RMS average. The different reflectance of the smooth and roughened areas creates a multiple-tone effect, and the areas may be arranged in alternating repetitive fashion to form a decorative pattern.

In terms of apparatus for forming the decorative panel, the invention comprises a non-sticking press plate having a planishing surface with adjacent smooth and slightly roughened areas, the surface roughness in the roughened area being less than 150 microinches RMS average. Preferably, the planishing surface has a plurality of alternating smooth and slightly roughened areas arranged in a repetitive, decorative pattern.

In terms of a method for forming a decorative laminated panel in accordance with the invention, the initial step is to layup a laminate in which one face is a sheet of thermosetting plastic. A press plate is then placed against the laminate, the press plate having a planishing surface in contact with the thermosetting-plastic sheet. The planishing surface has smooth and slightly roughened areas arranged in a decorative pattern, and the roughened areas have a surface roughness of less than 150 microinches RMS average. The press plate is then forced against the laminate under heat and high pressure in a laminating press to form the decorative pattern on the thermosetting plastic sheet. The laminate and press plate are maintained in the press under heat and high pressure until the thermosetting plastic is cured. Finally, the press plate is stripped from the cured laminate.

Figure 2:
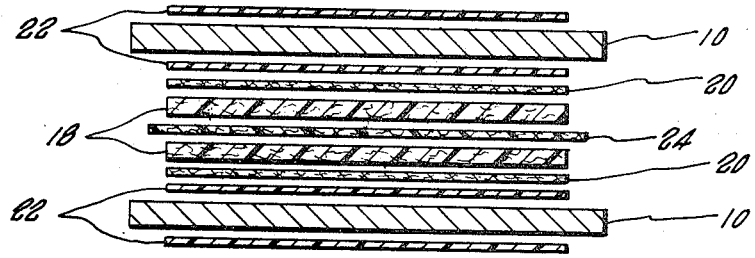

These and other aspects of the invention will be described with reference to the drawings, in which:

FIG. 1 is a plan view of the planishing surface of a press plate formed according to the invention; and FIG. 2 is an elevation in cross section of several laid-up laminates arranged in conjunction with a set of press plates for installation in a laminating press.

A press plate 10, formed in accordance with the invention, is shown in FIG. 1. A face 11 of the press plate is formed as a planishing surface. The opposite face (not shown) of the press plate may also be formed as a planishing surface, making the press plate useful to finish two separate laminated panels simultaneously. Other than the planishing surface, the press plate is conventional and may be formed from a plate of metal such as stainless steel of about one-eighth-inch thickness. The plate may be made in any convenient size, about four feet by eight feet being typical dimensions.

The planishing surface defined by face 11 is formed with a plurality of alternating smooth areas 13 and slightly roughened areas 14. FIG. 1 illustrates two of many possible decorative patterns of rough and smooth areas, the left side of the drawing showing a number of geometrically arranged smooth-surfaced circles in a slightly roughened field. The right side of the drawing illustrates a decorative pattern comprising a series of alternating smooth and slightly roughened laterally oriented bars. A press plate would of course normally include only a single decorative pattern, and the two patterns shown in FIG. 1 simply illustrate two possible decorative styles. A particular decorative style can also be finished to include three or more degrees of surface reflectivity.

Smooth areas 13 are polished to a desired finish which may be a mirror finish having a surface roughness of about 3 microinches RMS average. Roughened areas 14 are formed to a surface roughness of less than 150 microinches RMS average to avoid sticking of the press plate to the thermosetting plastic. The planishing surface is most easily formed by first polishing all of face 11 to a mirror finish, and then masking the areas which are to remain smooth in the desired decorative pattern. The unmasked areas are then roughened to complete the formation of the pattern. The techniques of polishing and roughening this type of surface are well known in the art, and need not be described in detail.

Preferably, the surface roughness of roughened areas 14 is less than 75 microinches RMS average to provide a panel surface which is readily cleaned and maintained, and a roughness of about 30 microinches RMS average has been found quite satisfactory. This relatively slight degree of roughness is sufficient to provide a dull or matte finish in the corresponding areas of the thermosetting-plastic panel to be formed, and provides a surface from which dust and dirt particles are easily removed without hard scrubbing. Smooth areas 13 are preferably finished to a surface roughness of about 3 microinches RMS average. A roughness difference of at least 10 microinches RMS average should exist between the smooth and roughened areas to provide the desired two-tone glossy-matte appearance in the finished panel. Preferably, the roughness difference is held in the range of 10 to 30 microinches RMS average.

The press plate is disposed between the platens of a conventional laminating press, with the planishing surface against a face of a sheet of thermosetting plastic to which the decorative pattern is to be applied. While the press plate may be used with a uniform sheet of thermosetting plastic, it will more typically be used in the formation of laminated panels. A layup of several such panels arranged between a pair of press plates is shown in FIG. 2.

Each panel layup includes a sheet of base material 18 which is impregnated with a thermosetting resin. Resins used in laminated panels should be of the thermosetting type to insure structural strength and rigidity, dimensional stability, and good bond strength. Many thermosetting resins are suitable for this application, including the melamines, phenolics, silicones and epoxies. The base material serves as a reinforcing agent in the laminate, and is typically formed of kraft paper. Cotton fabric, asbestos, fibrous glass materials, nylon fabrics, etc., are also useful as base materials. A sheet of colored kraft paper 20 is placed against one face of the base material. Finally, a transparent sheet 22 of thermosetting plastic such as melamine is placed over the sheet of colored kraft paper.

Two complete laminated-panel layups are shown in FIG. 2, the layups being oriented back-to-back with a sheet of wax paper 24 separating the two sheets of base material to ensure easy separation after completion of the curing cycle in the laminating press. A pair of press plates 10 are disposed on opposite sides of the two layups, the planishing surfaces of the press plates being in contact with the surface of thermosetting-plastic sheets 22.

As suggested in FIG. 2, both faces of the press plate are preferably finished as planishing surfaces, and additional layups are positioned above and below press plates 10 so each press plate forms and finishes two complete panels. Plastic sheets 22 of such additional layups are shown in FIG. 2. Typically, a stack of perhaps 4 or 5 press plates and associated panel layups will be positioned in the laminating press, permitting a number of laminated panels to be formed in a single curing cycle in the press.

When the stack of press plates and panel layups has been assembled in the press, the press is actuated to compress the stack together, forcing the press-plate planishing surfaces into intimate contact with the thermosetting-plastic sheets. Heat is also applied to the stack from the platens of the press, and the heat and pressure are maintained throughout a curing cycle of perhaps one hour, depending upon the particular plastic materials being treated. A typical curing cycle will involve the application of press pressure of about 1000 p.s.i. while the laminate-stack temperature is maintained at about 325° F.

At the completion of the curing cycle, the press platens are released, and the press plates and cured laminated panels are stripped apart and removed from the press. Clean separation of the press plates and panels is assured by maintaining the surface roughness of roughened areas 14 at less than 150 microinches RMS average. This very slight degree of roughness avoids sticking of the roughened surface to the thermosetting plastic sheet as the microscopic craters forming the roughened areas are shallow, and interstitial locking engagement of the plastic panel and press plate is avoided.

The finished laminated panel will have a surface which is an exact replica of the press-plate pattern illustrated in FIG. 1. That is, the panel surface will have adjacent smooth and slightly roughened areas, corresponding in arrangement to the pattern on the planishing surface of the press plate. The mirror finish of the smooth areas provides a high reflectance of incident light, and the roughened areas have a much lower reflectance, providing a two-tone effect to a viewer.

Color sheet 20 imparts an overall color to the panel which is visible through the transparent or translucent plastic sheet 22. The color appears glossy in the smooth-finished areas, and has a dull or matte finish in the roughened areas. The resulting pattern is a highly attractive surface which can be used in wall panels, or on table tops or other articles where appearance is an important factor.

The laminating process described above is conventional, and no additional steps are required to form the decorative pattern on the surface of the panel. Once the pattern is established on the planishing surface of the press plate, existing techniques may therefore be used for quantity production of laminated panels.

The invention is not limited to a laminate having a color sheet and "cover" sheet such as sheets 20 and 22, and the above-described manufacturing process is useful to produce panels from a thermosetting-impregnated base material alone, or a uniform sheet of thermosetting plastic. The "cover" sheet is helpful in applications where a high-gloss finish is desired in the smooth zones of the pattern, and may be dispensed with where a softer appearance is wanted in the smooth zones.

What is claimed is as follows:

1. A method of forming a decorative panel in a laminating press, comprising the steps of:
   (a) laying up a laminate in which one face is a sheet of thermosetting plastic;
   (b) placing a press plate against the laminate, the press plate having a planishing surface in contact with the thermosetting-plastic sheet, the planishing surface having smooth areas and slightly roughened areas arranged in adjacent relationship to form a decorative pattern, the roughened areas having a surface roughness of less than 150 microinches RMS average, the difference in surface roughness between the smooth and roughened areas being at least about 10 microinches RMS average;
   (c) forcing the press plate against the laminate under heat and high pressure in a laminating press to form the decorative pattern on the thermosetting-plastic sheet;
   (d) maintaining the laminate and press plate in the press under heat and high pressure until the thermosetting plastic is cured; and
   (e) stripping the press plate from the cured laminate.

2. A method of forming a decorative panel in a laminating press, comprising the steps of:
   (a) laying up a laminate in which one face is a sheet of opaque thermosetting plastic, and a second face is a sheet of thermosetting-resin-impregnated base material;
   (b) placing a press plate against the laminate, the press plate having a planishing surface in contact with the thermosetting-plastic sheet, the planishing surface having smooth areas and slightly roughened areas arranged in adjacent relationship to form a decorative pattern, the roughened areas having a surface roughness of less than 150 microinches RMS average, the difference in surface roughness between the smooth and roughened areas being at least about 10 microinches RMS average;
   (c) forcing the press plate against the laminate under heat and high pressure in a laminating press to form the decorative pattern on the thermosetting-plastic sheet;
   (d) maintaining the laminate and press plate in the press under heat and high pressure until the laminate is cured; and
   (e) stripping the press plate from the cured laminate.

3. A method of forming a decorative panel in a laminating press, comprising the steps of:
   (a) inserting a panel of thermosetting-plastic material in a laminating press;
   (b) placing a press plate against the panel, the press plate having a planishing surface in contact with a face of the panel, the planishing surface having smooth areas and slightly roughened areas arranged in adjacent relationship to form a decorative pattern, the roughened areas having a surface roughness of less than 150 microinches RMS average, the difference in surface roughness between the smooth and roughened areas being at least about 10 microinches RMS average;
   (c) forcing the press plate against the panel under heat and high pressure in the laminating press to form the decorative pattern on the face of the panel;
   (d) maintaining the panel and press plate in the press under heat and high pressure until the thermosetting-plastic material is cured; and
   (e) stripping the press plate from the panel.

4. A method of forming a decorative panel in a laminating press, comprising the steps of:
   (a) inserting a panel of thermosetting-plastic material in a laminating press;
   (b) placing a press plate against the panel, the press plate having a planishing surface in contact with a face of the panel, the planishing surface having smooth areas and slightly roughened areas arranged in adjacent relationship to form a decorative pattern, the roughened areas having a surface roughness of less than 75 microinches RMS average, the difference in surface roughness between the smooth and roughened areas being in the range of about 10 to 30 microinches RMS average;
   (c) forcing the press plate against the panel under heat and high pressure in the laminating press to form the decorative pattern on the face of the panel;
   (d) maintaining the panel and press plate in the press under heat and high pressure until the thermosetting-plastic material is cured; and
   (e) stripping the press plate from the panel.

References Cited

UNITED STATES PATENTS

| | | | |
|---|---|---|---|
| 2,697,893 | 12/1954 | Schaum | 161—2 |
| 2,801,198 | 7/1957 | Morris et al. | 161—246 |
| 3,311,692 | 3/1967 | Baird | 264—293 |

JACOB H. STEINBERG, Primary Examiner

U.S. Cl. X.R.

156—209; 161—164, 138, 406, 413